(12) United States Patent
Fripp et al.

(10) Patent No.: US 11,066,904 B2
(45) Date of Patent: Jul. 20, 2021

(54) SYSTEM, METHOD, AND DEVICE FOR POWERING ELECTRONICS DURING COMPLETION AND PRODUCTION OF A WELL

(71) Applicant: Halliburton Energy Services, Inc., Houston, TX (US)

(72) Inventors: Michael Linley Fripp, Carrollton, TX (US); Stephen Michael Greci, Little Elm, TX (US); Thomas Jules Frosell, Irving, TX (US); Richard Decena Ornelaz, Frisco, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 130 days.

(21) Appl. No.: 15/776,503

(22) PCT Filed: Dec. 28, 2016

(86) PCT No.: PCT/US2016/068845
§ 371 (c)(1),
(2) Date: May 16, 2018

(87) PCT Pub. No.: WO2018/125076
PCT Pub. Date: Jul. 5, 2018

(65) Prior Publication Data
US 2019/0316445 A1   Oct. 17, 2019

(51) Int. Cl.
*E21B 41/00* (2006.01)
*E21B 21/00* (2006.01)
*H02K 7/18* (2006.01)

(52) U.S. Cl.
CPC ........ *E21B 41/0085* (2013.01); *E21B 21/002* (2013.01); *H02K 7/18* (2013.01)

(58) Field of Classification Search
CPC .... E21B 41/0085; E21B 21/002; E21B 41/00; H02K 7/18
See application file for complete search history.

(56) References Cited

U.S. PATENT DOCUMENTS

| 4,578,675 A | * | 3/1986 | MacLeod | E21B 17/003 340/853.7 |
| 5,626,200 A | | 5/1997 | Gilbert et al. | |

(Continued)

FOREIGN PATENT DOCUMENTS

| CN | 105658906 B1 | 11/2019 |
| EP | 0681090 A2 | 11/1995 |

(Continued)

OTHER PUBLICATIONS

International Search Report and the Written Opinion for International Application No. PCT/US2016/068845 dated Sep. 15, 2017, 15 pages.

*Primary Examiner* — Kristyn A Hall
*Assistant Examiner* — Jonathan Malikasim
(74) *Attorney, Agent, or Firm* — Chamberlain Hrdlicka (57) ABSTRACT

A system, method, and power control device for powering electronics located in a wellbore intersecting a subterranean earth formation. The system comprises a battery, a turbine generator, an electronic device, and a processor. The battery is locatable in the wellbore and the turbine generator is locatable in the wellbore so as to be in fluid communication with a flow path in the wellbore. The electronic device is locatable in the wellbore and electrically coupled to the battery and the turbine generator. The processor determines if a power condition is satisfied to allow the turbine generator to power the electronic device. The method comprises powering an electronic device located in the wellbore using a battery and opening a closed flow path in communication (Continued)

with a turbine generator. The method also comprises powering the electronic device using the turbine generator if a power condition is satisfied.

18 Claims, 3 Drawing Sheets

(56) References Cited

U.S. PATENT DOCUMENTS

| | | | |
|---|---|---|---|
| 6,817,412 B2 * | 11/2004 | Haase | E21B 17/003 |
| | | | 166/250.01 |
| 7,165,608 B2 | 1/2007 | Schultz et al. | |
| 7,717,167 B2 * | 5/2010 | Storm | E21B 36/00 |
| | | | 166/57 |
| 8,230,913 B2 | 7/2012 | Hart et al. | |
| 9,234,404 B2 | 1/2016 | Felten | |
| 9,515,499 B2 * | 12/2016 | Signorelli | E21B 49/00 |
| 2004/0256113 A1 | 12/2004 | Logiudice | |
| 2005/0012340 A1 | 1/2005 | Cousins | |
| 2006/0191682 A1 | 8/2006 | Storm et al. | |
| 2008/0007423 A1 | 1/2008 | Krueger | |
| 2008/0142215 A1 | 6/2008 | Pabon | |
| 2012/0067567 A1 | 3/2012 | Rytlewski et al. | |
| 2013/0153242 A1 | 6/2013 | Flight et al. | |
| 2014/0354395 A1 | 12/2014 | Tavernier | |
| 2015/0361788 A1 * | 12/2015 | Liu | E21B 41/0085 |
| | | | 340/855.4 |
| 2016/0170417 A1 | 6/2016 | Sun, Jr. | |
| 2017/0271688 A1 * | 9/2017 | Shanfield | H02N 2/186 |
| 2019/0017349 A1 * | 1/2019 | Liu | E21B 34/066 |

FOREIGN PATENT DOCUMENTS

| | | |
|---|---|---|
| EP | 2276908 B1 | 1/2012 |
| EP | 2808883 A1 | 12/2014 |
| WO | 2011002301 A1 | 1/2011 |
| WO | 2013090037 A1 | 6/2013 |
| WO | WO2014204768 A1 * | 12/2014 |
| WO | 2016001174 A1 | 1/2016 |
| WO | 2016055316 A1 | 4/2016 |
| WO | 2016055451 A1 | 4/2016 |

* cited by examiner

SYSTEM, METHOD, AND DEVICE FOR POWERING ELECTRONICS DURING COMPLETION AND PRODUCTION OF A WELL

CONTEXT

This section is intended to provide relevant contextual information to facilitate a better understanding of the various aspects of the described embodiments. Accordingly, it should be understood that these statements are to be read in this light and not as admissions of prior art.

During a multizone completion operation, a tubing string is introduced into a cased wellbore which has been previously perforated and the string is then placed so that production screens are positioned proximate the perforations. As used herein, completion operation refers to the events and equipment necessary to bring a wellbore into production once drilling operations have been concluded. Production can be stimulated by injection of fracturing fluid, acid, solvents, or other chemicals into the perforations. To accomplish this, stimulation operations are performed in portions of the wells to increase a production rate and/or capacity of hydrocarbons from the formation. As used herein, the terms "stimulate" and "stimulation" refer to a treatment performed to restore or enhance the productivity of a well. Stimulation operations include a procedure known as "hydraulic fracturing" wherein fluid is injected into a formation above the fracture pressure of the reservoir formation to create highly conductive flow paths between reservoir and the formation. Other stimulation operations include acidizing, acid-fracing, etc.

Where the wellbore is lined with casing and cement, the stimulation fluids may be conveniently injected into a specific desired stimulation location within a formation by forming openings radially through the casing and cement at the stimulation location. These openings are typically formed by perforating the casing utilizing shaped explosive charges or water jet cutting. The stimulation fluids may then be pumped from the earth's surface, through tubing extending into the casing, and outward into the formation through the perforations.

Where there are multiple desired stimulation locations, sealing devices, such as packers and plugs, are employed to permit each location to be separately stimulated. Each stimulation location within a single formation, or within multiple formations, intersected by a well can be isolated from other stimulation locations, and thus allowing the stimulation operation to be tailored for the specific stimulation location (e.g., type of stimulation fluid, stimulation fluid pressure, and flow rate into the formation). The casing and cement lining the wellbore, along with the sealing devices, prevent loss of stimulation fluids from each desired stimulation location during the stimulation operation. In this manner, an operator performing the stimulation operation can be assured that all of the stimulation fluids intended to be injected into a formation at a desired location are indeed entering the formation at that location.

DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
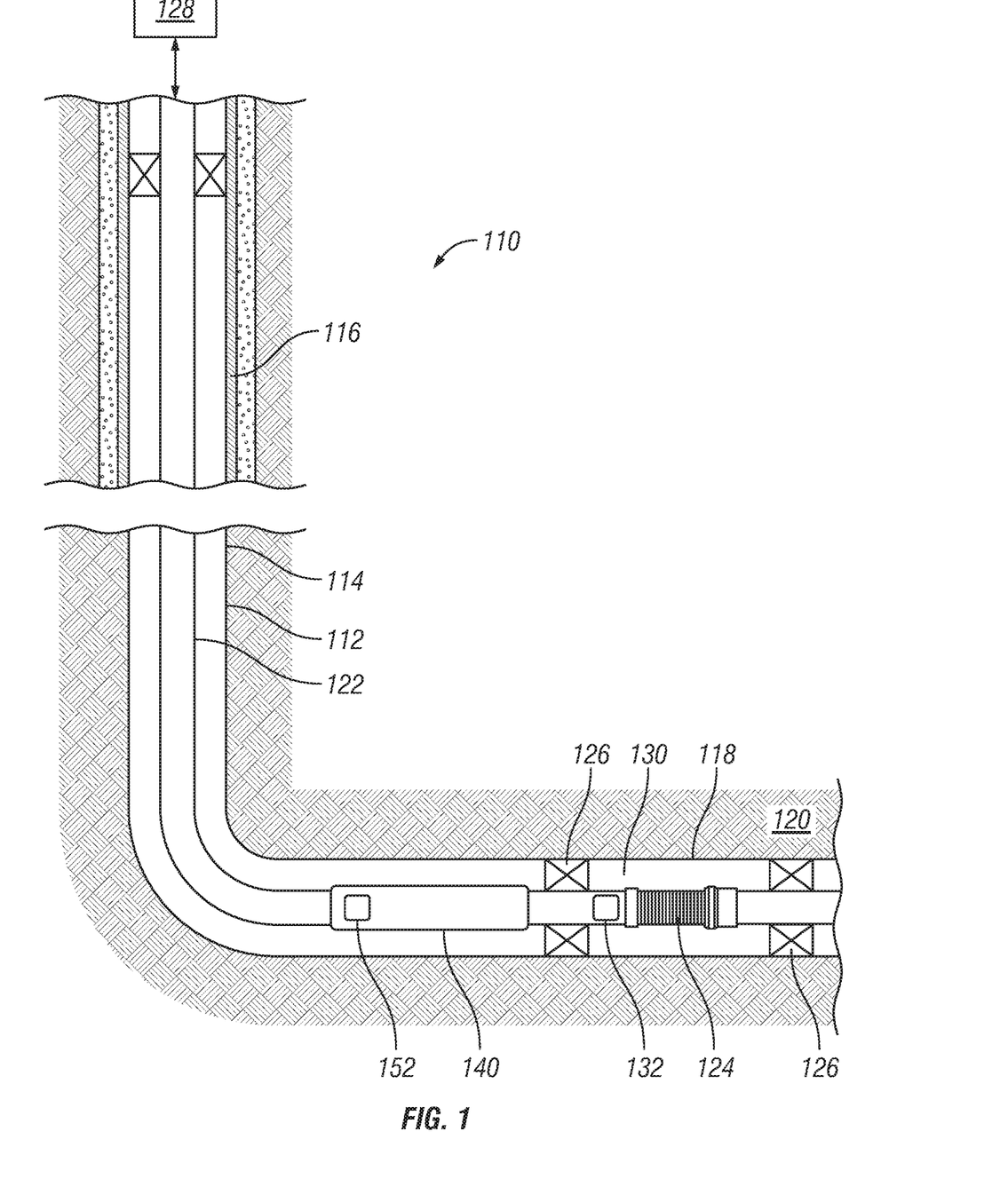
FIG. 1 shows an elevation view of a well system, according to one or more embodiments.

FIG. 1 shows an elevation view of a well system 110 including a screen section 124 and a power control device 140, in accordance with one or more embodiments. As shown, a wellbore 112 intersects a subterranean earth formation 120. The wellbore 112 has a vertical section 114, which is at least partially cemented with a casing string 116, and a horizontal section 118, which can be an open-hole section of the wellbore 112. Other wellbore configurations may also be suitable.

Positioned within the wellbore 112 and extending from the surface is a tubing string 122, which provides a conduit for formation fluids to travel from the formation 120 to the surface and for stimulation fluids to travel from the surface to the formation 120. The tubing string 122 includes a screen section 124, each of which is positioned between a pair of annular barriers depicted as packers 126 that provides a fluid seal between the tubing string 122 and the wellbore 112, thereby defining a production intervals 130. The screen section 124 is employed to inject stimulation fluid into the formation or filter particulate matter out of the production fluid stream. A flow control device 132 may also be located in the wellbore 112 and configured to control the flow of fluid entering, flowing through, or exiting a flow path such as the tubing string 122. The tubing string 122 also includes a power control device 140 to provide power to various electronic components, including but not limited to pumps, sensors, actuators, valves, sleeves, and baffles used to stimulate the formation and/or produce formation fluids, as further described herein with respect to FIGS. 2 and 3. Although FIG. 1 shows the power control device 140 positioned in a zone that is not being produced, it should be understood that the power control device 140 may be positioned anywhere along the wellbore 112, including proximate the screen section 124. In a preferred embodiment, a plurality of power control devices 140 are deployed in the wellbore 112.

The power control device 140 may include a telemetry device 152 that receives data provided by various sensors located in the wellbore 112, and transmits the data to a surface control unit 128. The sensors may include a receiver responsive to electromagnetic radiation for measuring formation resistivity, a gamma ray device for measuring formation gamma ray intensity, devices for measuring the inclination and azimuth of the tubing string 122, pressure sensors for measuring fluid pressure, temperature sensors for measuring wellbore temperature, distributed optical sensors, a flow meter for measuring flow rates, geophones or accelerometers for taking seismic, microseismic, or vibration measurements, a device for measuring fluid composition, etc.

Data may also be provided by the surface control unit 128, received by the telemetry device 152, and transmitted to the various electronic devices located in the wellbore 112 to perform functions, such as actuating a valve. The surface control unit 128 can include a computer system for processing and storing the measurements gathered by the sensors located in the wellbore 112. Among other things, the computer system may include a non-transitory computer-readable medium (e.g., a hard-disk drive and/or memory) capable of executing instructions to perform such tasks. In addition to collecting and processing measurements, the computer system may be capable of controlling completion, stimulation, and production operations including but not limited to as installation of the packers 126, acidizing, gravel packing, or hydraulic fracturing. The surface control unit 128 may further include a user interface (not shown), e.g., a monitor or printer, which displays the measurements and allows an operator to monitor the completion, stimulation and production operations.

Figure 2:
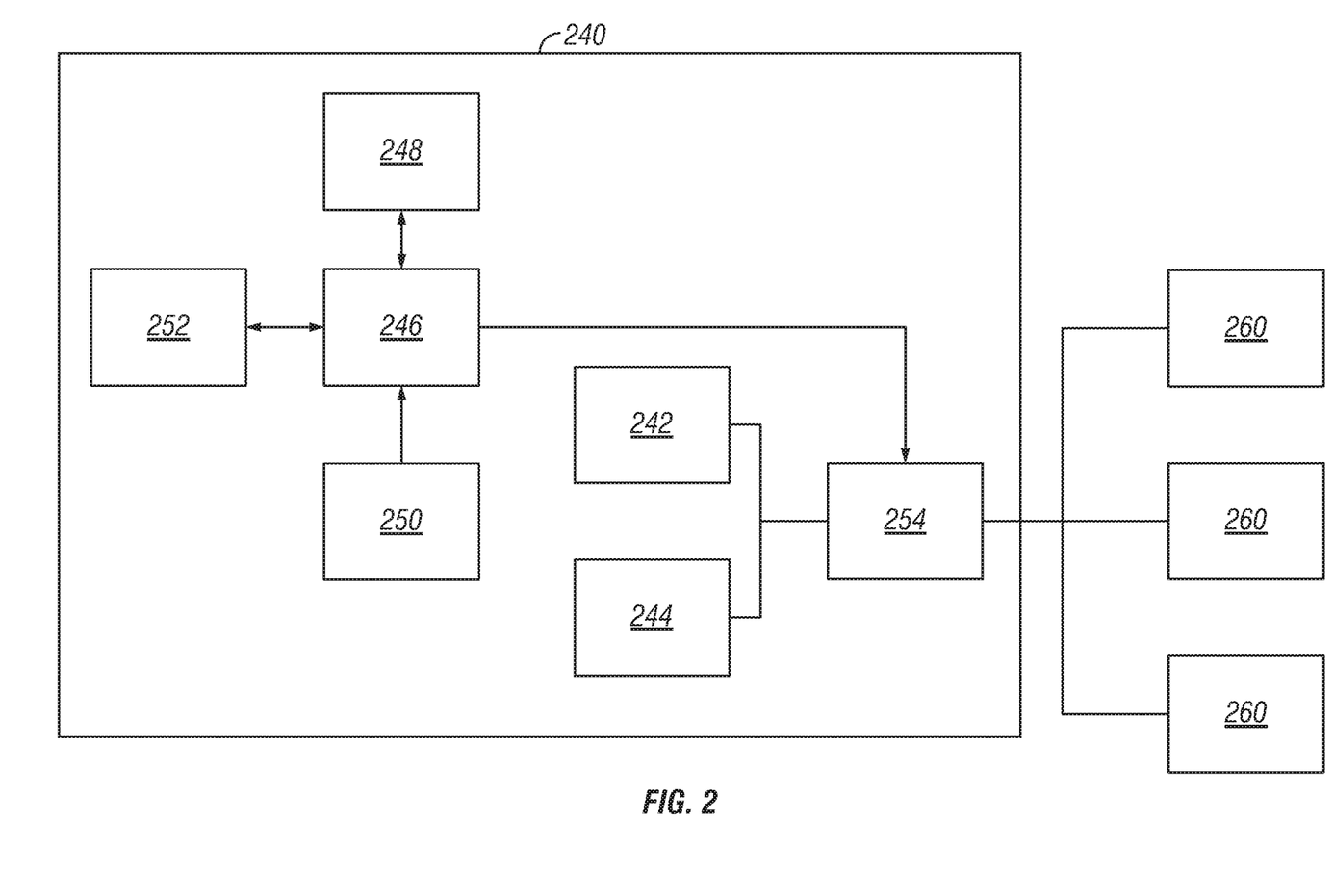
FIG. 2 shows a block diagram view of a power control device electrically coupled to one or more electronic device(s), according to one or more embodiments.

FIG. 2 shows a block diagram view of a power control device 240 electrically coupled to one or more electronic device(s) 260, in accordance with one or more embodiments. The power control device 240 includes a battery 242, a turbine generator 244, a processor 246, an information storage device 248, a power sensor 250, a telemetry device 252, and a switch 254. The power control device 240 supplies power to the electronic devices 260 located in a wellbore. The battery 242 and the turbine generator 244 may also be in electrical communication with and supply power to any one or a combination of the processor 246, the storage device 248, the power sensor 250, and the telemetry device 252 as is needed to operate these components downhole. The electronic devices 260 are not supplied power via an umbilical to the surface, and thus, the power control device 240 is the only source of electric power downhole for these devices. For example, the electronic devices 260 may be installed in a lateral wellbore where an umbilical to supply power cannot be installed. Although the components 242-254 are depicted as being integral with or included in the power control device 240, it should be appreciated that any of these may be separate components in communication with the power control device 240.

The battery 242 includes any suitable device comprising one or more cells connected together to furnish electric current to the electronic devices 260. The battery 242 may only be one or more primary batteries, including but not limited to a lithium primary battery, a lithium thionyl chloride battery, a lithium sulfuryl chloride battery, a lithium ion battery, a molten salt battery, or a solid state battery. As used herein, a primary battery refers to a non-rechargeable battery, whereas a secondary battery refers to a rechargeable battery. The battery 242 may supply power to the electronic devices 260 during the initial completion and stimulation operations when there is insufficient fluid flow to generate enough power from the turbine generator 244 to power the electronic devices 260. The battery 242 may also supply power to the electronic devices 260 in conjunction with the turbine generator 244 as further described herein.

The turbine generator 244 includes any suitable device that converts mechanical energy from fluid flowing through a flow path (e.g., the tubing string 112 or the screen section 124 of FIG. 1) to electrical energy. The turbine generator 244 includes a turbine (not shown) in fluid communication with the flow path to rotate the turbine. The turbine generator 244 generates an electric current as fluid passes through or across the turbine coupled to a rotor that rotates within a stator to induce the electric current. As a non-limiting example, the turbine generator 244 may include a rotating magnet, called the rotor, which turns within a stationary set of conductors wound in coils, called the stator, to induce the electric current. The turbine generator 244 may also be a dynamo that produces direct current (including a brushed turbine generator) or an alternator that produces an alternating current (including a brushless turbine generator).

When the flow path in communication with the turbine generator 244 is closed, the battery 242 supplies power to the electronic devices 260 located in the wellbore 112 of FIG. 1. For example, the flow path in communication with the turbine generator 244 can be closed when the packers 126 of FIG. 1 are being set in the wellbore 112 of FIG. 1 as hydrostatic pressure is used to expand the packers 126. After the flow path in communication with the turbine generator 244 is opened, the turbine generator 244 can provide power to the electronic devices 260. For example, the turbine generator 244 may supply power to the electronic devices 260 during stimulation operations that inject fluid into the formation as fluid flows through the flow path in communication with the turbine generator 244. The turbine generator 244 may also supply power to the electronic devices 260 during production of formation fluid as fluid flows through the flow path in communication with the turbine generator 244.

The electronic devices 260 are locatable in a wellbore (e.g., the wellbore 112 of FIG. 1) to perform completion and/or production operations in the well and are electrically coupled to the battery 242 as well as the turbine generator 244. An electronic device 260 may include devices such as a sensor used to monitor the completion and/or production operations conducted in the well. The sensor can include one or more devices configured to measure a downhole parameter, including but not limited to pressure, flow rate, tool position, tool orientation, valve position, vibration, fluid composition, tool passage, wellbore temperature, resistivity, or a combination thereof. For example, the sensor may include at least one of a pressure gauge, flow meter, accelerometer, geophone, gravitometer, proximity sensor, spectrometer, temperature sensor, magnetometer, electromagnetic receiver, etc. The electronic devices 260 may also include the processor 246, the storage device 248, the power sensor 250, and the telemetry device 252 so that these components of the power control device 240 may receive power as well.

As another example, the electronic devices 260 may include a valve, a pump, or an actuator. The valve can be electrically actuated to control fluid flow through the tubing string 112 of FIG. 1. The flow control devices 132 may include a valve (e.g., a solenoid valve) to control fluid entering, flowing through, or exiting the tubing string 112. The pump may be an electric submersible pumps (ESPs) used to pump formation fluid into the tubing string 112. The actuator can be used to actuate downhole tools located in the well. For example, the actuator may be used to set latches, release baffles, or shift sleeves and can include a solenoid, magnetorestrictive device, electric motor, piezoelectric device, pyrotechnic device, an electromagnetic transducer, or any other suitable device configured to convert electrical energy into mechanical energy.

The processor 246 is used to monitor a power condition associated with the power supplies, the battery 242 and the turbine generator 244, to determine whether the battery 242, the turbine generator 244, or both is/are to be used to supply power to the electronic devices 260. As used herein, the term processor is intended to include devices such as a field programmable gate array (FPGA), peripheral interface controller (PIC), advanced RISC machine (ARM), digital signal processor (DSP), microcontroller unit (MCU), microprocessor unit (MPU), and AVR processors. The processor 246 is configured to determine if the power condition is satisfied to allow the turbine generator 244 to power the electronic devices 260, and the processor 246 is configured to power the electronic devices 260 only with the battery 242 if the power condition is not satisfied. The processor 246 may control a switch 254 (e.g., a transistor, a selector, multiplexer, or multiswitch) coupled to the battery 242 and the turbine generator 244 to select which power supply or both power supplies power(s) the electronic devices 260. The switch 254 may also be operable to select which electronic devices 260 receive power from the power supplies to regulate the electrical load on the battery 242 and/or the turbine generator 244.

The power condition can include, but is not limited to, any one or combination of a power threshold, time duration, pressure, flow rate, and temperature. For example, the power condition can be whether the power output of the battery 242 and/or the turbine generator 244 satisfies the power threshold, which can include a threshold voltage, electric current, or electric power. The power condition can also be whether the electronic devices 260 have been powered by the battery 242 for a certain duration of time or whether a condition in the wellbore is satisfied to indicate that the turbine generator 244 can provide sufficient power to the electronic devices 260 (e.g., a fluid flow rate, temperature, or pressure in the fluid flow path to power the turbine generator 244).

The information storage device 248 may include a non-transitory storage medium to electronically store information or data received from sensors located in the wellbore (such as the power sensor 250 or the electronic devices 260). The non-transitory storage medium may include ROM, EPROM, EEPROM, flash memory, RAM, a hard drive, a solid state disk, an optical disk, or a combination thereof. The control and processing of the power control device 240 is performed with the use of a computer program stored on the storage device 248.

The power sensor 250 is in communication with the processor 246 to provide measurements to monitor the power condition of any one or combination of the battery 242 and the turbine generator 244. The power sensor 250 can include one or more devices configured to measure a parameter associated with the power condition, including but not limited to voltage, electric current, electric power, pressure, flow rate, temperature, or a combination thereof. The power sensor 250 may include but is not limited to a volt meter, an ammeter, a watt meter, a pressure gauge, a flow meter, a temperature sensor, or a combination thereof.

The telemetry device 252 may be used to receive or transmit data to various devices of the well system 110. The measurements from the power sensor 250 or the power condition may be transmitted to a surface control unit (e.g., a surface control unit 128 of FIG. 1) and output to a suitable medium, such as a display, tablet, or printer. The surface control unit 128 may also transmit commands to the telemetry device 252 to control which power supply (the battery 242, the turbine generator 244, or both) provides power to the electronic devices 260. The telemetry device 252 may enable data to be output and/or received in real-time, pseudo real-time, and/or at a later time or date. The telemetry device 252 may include a telemetry system to communicate with the surface control unit 128, such as an acoustic pulse telemetry transceiver. The telemetry device 252 may include a direct cable connection device to enable a cable to be input into the telemetry device 252 to transmit and/or upload data. The telemetry device 252 may also include a wireless communication device, in which the wireless communication device may include, but is not limited to, an inductive coupling unit, acoustic telemetry through the tubing string (112 in FIG. 1), acoustic telemetry through the wellbore fluid, a radio-frequency unit, a radio-frequency identification unit, and/or a suitable wireless communication unit (e.g., ZigBee, Bluetooth, UHF, VHF, Wi-Fi, or the like).

It should be appreciated that other electrical components may be included with the power control device 240, including but not limited to a current rectifier or a voltage regulator. For example, where the turbine generator 244 generates an alternating current, a current rectifier may be used to convert the AC power to DC power for the electronic devices 260. The current rectifier may be a half-wave rectifier, a full-wave rectifier, or any other device suitable to rectify the AC current. As another non-limiting example, a voltage regulator may be used to convert the voltage generated by the turbine generator 244 to the voltage needed by the electronic devices 260. The voltage regulator may be a step-up or step-down voltage regulator including a buck-boost transformer or a buck-boost converter.

Figure 3:
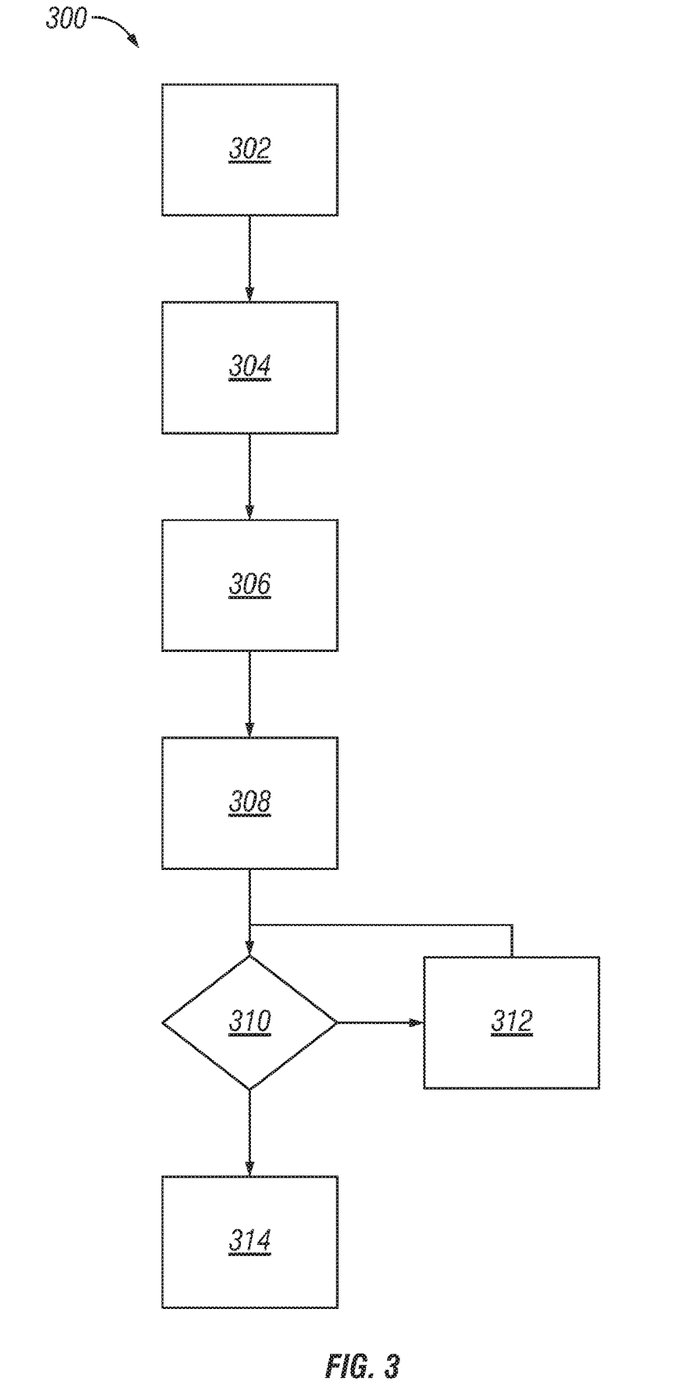
FIG. 3 shows a flowchart view of a method of powering electronics in a wellbore during a completion operation according to one or more embodiments.

FIG. 3 shows a flowchart view of a method 300 of powering electronics in a wellbore during completion and production operations, in accordance with one or more embodiments. At block 302, completion equipment is positioned and installed in a well without an umbilical to the surface to supply power. The completion equipment can include, but is not limited to, the equipment depicted in FIGS. 1 and 2 such as the tubing string 122, screen section 124, packers 126, flow control device 132, power control device 140, and electronic devices 260. In the early stage of the completion, such as before stimulation, the flow path through the tubing string 122 may be blocked in order to aid the stimulation. For example, at block 304, a flow path in communication with the turbine generator 244 is closed during a completion operation, such as setting the packers 126 by diverting the fluid in the tubing string 122 with the flow control device 132 to radially expand the packer 126. With the flow path closed, the turbine generator 244 is unable to generate power for the electronic devices 260. The flow path may also be closed during installation of other completion equipment or during part of the wellbore stimulation.

At block 306, the battery 246 powers the electronic devices 260 during the installation of the completion equipment and while various completion operations are being conducted. A stimulation operation or other completion operations may be performed while the electronic devices 260 are being powered by the battery 242. The stimulation operation may include, but is not limited to, formation cleanup, circulating wellbore fluids, acidization, gravel packing, and/or hydraulic fracturing of the wellbore. The battery 242 can provide power to the processor 246 to use the sensor measurements of the electronic devices 260 to estimate flow diversion, formation parameters, and the robustness of the installation of completion equipment. The battery 242 can provide power for the telemetry device 252 to receive wireless commands and to transmit sensor data to the surface. The telemetry device 252 may transmit data collected by the various sensors of the battery-powered electronic devices 260 to the surface so that completion and stimulation operations can be monitored and optimized. The battery 242 can also provide power to downhole tools including setting latches, releasing baffles, shifting sleeves, and opening valves to perform various completion or stimulation operations.

At block 308, the flow path in communication with the turbine generator 244 may be opened during or after stimulation. For example, the flow path may be opened to allow stimulation fluid to be injected into the formation. The stimulation fluid can include brine, water, drilling fluid, oil, acid (organic or inorganic), or a gel. The flow path may also be open during production to allow formation fluid to travel to the surface. The flow path may be opened in response to receiving a command from the surface, in response to a certain time duration expiring, or in response to one or more of the sensor measurements of the electronic devices 260 indicating that the formation is suitable for production, such as acoustic vibrations or temperature changes that indicate that the stimulation is completed to produce formation fluids. With the flow path open, the turbine generator 244 may produce an electric current, which can power the electronic devices 260. Thus, it should be appreciated that the turbine generator 244 can generate power during either a stimulation operation or production of formation fluids. However, the power generated by the turbine generator 244 can be different depending on the direction of the fluid flow. In a preferred embodiment, the turbine generator 244 produces significantly more power during production than during a stimulation operation, including injecting a stimulation fluid into the formation.

At decision block 310, the processor 246 monitors the power condition using the power sensor 250 to select any one or combination of the power supplies (the battery 242, the turbine generator 244, or both) to provide power to the electronic devices 260. If the power condition is not satisfied, the battery 242 continues to power the electronic devices 260 at block 312. If the power condition is satisfied, the processor 246 allows the turbine generator 244 to power the electronic devices 260 at block 314. The processor 246 may also receive a command from the surface control unit 128 via the telemetry device 252 and the command may indicate any one or combination of the power supplies (the battery 242, the turbine generator 244, or both) that is/are to be used to provide power to the electronic devices 260. Thus, the processor 246 may control any one or combination of the power supplies (the battery 242, the turbine generator 244, or both) that is/are used to provide power to the electronic devices 260 based on the received command or the monitored power condition.

While there may be a short period of time where power is provided by both the battery 242 and the turbine generator 244, shortly after production begins the turbine generator 244 is the only source of electrical power for the electronic devices 260. When the battery 242 is discharged, the turbine generator 244 continues to provide power to the electronic devices 260 without the battery 242.

In addition to the embodiments described above, many examples of specific combinations are within the scope of the disclosure, some of which are detailed below:

Example 1

A system for powering electronics located in a wellbore intersecting a subterranean earth formation, comprising:
 a battery locatable in the wellbore;
 a turbine generator locatable in the wellbore so as to be in fluid communication with a flow path in the wellbore;
 an electronic device locatable in the wellbore and electrically coupled to the battery and the turbine generator; and
 a processor configured to determine if a power condition is satisfied to allow the turbine generator to power the electronic device.

Example 2

The system of example 1, wherein the electronic device is powered by the battery if the power condition is not satisfied.

Example 3

The system of example 1, wherein the electronic device includes any one or combination of a sensor, a valve, a pump, and an actuator.

Example 4

The system of example 3, wherein the sensor is configured to measure any one or combination of pressure, flow rate, tool position, tool orientation, valve position, vibration, fluid composition, and temperature.

Example 5

The system of example 1, wherein the processor is configured to select only the turbine generator to power the electronic device.

Example 6

The system of example 1, further comprising a flow control device in communication with and configured to control the flow of fluid through the flow path.

Example 7

The system of example 1, wherein the battery is a primary battery, and the power condition includes any one or combination of a power threshold, time duration, pressure, flow rate, and temperature.

Example 8

A method of powering electronics located in a wellbore intersecting a subterranean earth formation, comprising:
 powering an electronic device located in the wellbore using a battery;
 opening a closed flow path in communication with a turbine generator; and
 powering the electronic device using the turbine generator if a power condition is satisfied.

Example 9

The method of example 8, further comprising performing a completion operation while using the electronic device.

Example 10

The method of example 8, further comprising stimulating the formation while using the electronic device.

Example 11

The method of example 8, wherein the electronic device includes any one or combination of a sensor, a valve, a pump, and an actuator.

Example 12

The method of example 11, wherein the sensor is configured to measure any one or combination of pressure, flow rate, tool position, tool orientation, valve position, vibration, fluid composition, and temperature.

Example 13

The method of example 8, further comprising closing the flow path in communication with the turbine generator using a flow control device during a completion operation.

Example 14

The method of example 8, wherein the battery is a primary battery, and the power condition includes any one or a combination of a power threshold, time duration, pressure, flow rate, and temperature.

Example 15

The method of example 8, further opening the closed flow path only after formation stimulation is completed.

Example 16

The method of example 8, further opening the closed flow path during formation stimulation.

Example 17

A power control device, comprising:
a battery locatable in a wellbore;
a turbine generator locatable in the wellbore so as to be in fluid communication with a flow path in the wellbore; and
a processor configured to determine if a power condition is satisfied to allow the turbine generator to power an electronic device locatable in the wellbore.

Example 18

The power control device of example 17, wherein the processor is configured to power the electronic device only with the battery if the power condition is not satisfied.

Example 19

The power control device of example 17, further comprising a power sensor configured to measure the power condition of the battery and the turbine generator.

Example 20

The power control device of example 17, wherein the battery is a primary battery, and the power condition includes any one or combination of a power threshold of the turbine generator, a power threshold of the battery, time duration, pressure, flow rate, and temperature.

This discussion is directed to various embodiments. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . " Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present disclosure has been described with respect to specific details, it is not intended that such details should be regarded as limitations on the scope of the disclosure, except to the extent that they are included in the accompanying claims.

What is claimed is:

1. A system for powering electronics located in a completion in a wellbore having a flow path and intersecting a subterranean earth formation, comprising:
a non-rechargeable battery that is part of completion equipment locatable in the wellbore;
a turbine generator that is part of the completion equipment locatable in the wellbore so as to be in fluid communication with the flow path in the wellbore;
an electronic device that is part completion equipment locatable in the wellbore and electrically coupled to the non-rechargeable battery and the turbine generator; and
a processor configured to power the electronic device only with the non-rechargeable battery only until the first time a power condition is satisfied, after which the turbine generator is allowed to power the electronic device.

2. The system of claim 1, wherein the electronic device includes any one or combination of a sensor, a valve, a pump, and an actuator.

3. The system of claim 2, wherein the sensor is configured to measure any one or combination of pressure, flow rate, tool position, tool orientation, valve position, vibration, fluid composition, and temperature.

4. The system of claim 1, wherein the processor is configured to select only the turbine generator to power the electronic device.

5. The system of claim 1, further comprising a flow control device in communication with and configured to control the flow of fluid through the flow path.

6. The system of claim 1, wherein the power condition includes any one or combination of a power threshold, time duration, pressure, flow rate, and temperature.

7. A method of powering electronics located in completion equipment in a wellbore intersecting a subterranean earth formation, comprising:
    powering an electronic device located in completion equipment in the wellbore using only a non-rechargeable battery permanently installed in the completion equipment;
    opening a closed flow path in communication with a turbine generator permanently installed in the completion equipment;
    powering the electronic device using only non-rechargeable battery only until the first time a power condition is satisfied; and
    allowing the turbine generator to power the electronic device after the first time the power condition is satisfied.

8. The method of claim 7, further comprising performing a completion operation while using the electronic device.

9. The method of claim 7, further comprising stimulating the formation while using the electronic device and only allowing the turbine generator to power the electronic device after the stimulation is complete.

10. The method of claim 7, wherein the electronic device includes any one or combination of a sensor, a valve, a pump, and an actuator.

11. The method of claim 10, wherein the sensor is configured to measure any one or combination of pressure, flow rate, tool position, tool orientation, valve position, vibration, fluid composition, and temperature.

12. The method of claim 7, further comprising closing the flow path in communication with the turbine generator using a flow control device during a completion operation.

13. The method of claim 7, wherein the power condition includes any one or a combination of a power threshold, time duration, pressure, flow rate, and temperature.

14. The method of claim 7, further opening the closed flow path only after formation stimulation is completed.

15. The method of claim 7, further opening the closed flow path during formation stimulation.

16. A power control device for completion equipment locatable a wellbore having a flow path comprising:
    a non-rechargeable battery locatable in the wellbore;
    a turbine generator locatable in the wellbore so as to be in fluid communication with the flow path in the wellbore; and
    a processor configured to power an electronic device locatable in the wellbore only with the non-rechargeable battery only until the first time a power condition is satisfied, after which the turbine generator is allowed to power the electronic device.

17. The power control device of claim 16, further comprising a power sensor configured to measure the power condition of the non-rechargeable battery and the turbine generator.

18. The power control device of claim 16, wherein the power condition includes any one or combination of a power threshold of the turbine generator, a power threshold of the battery, time duration, pressure, flow rate, and temperature.

* * * * *

UNITED STATES PATENT AND TRADEMARK OFFICE
CERTIFICATE OF CORRECTION

PATENT NO. : 11,066,904 B2  
APPLICATION NO. : 15/776503  
DATED : July 20, 2021  
INVENTOR(S) : Michael Linley Fripp et al.

Page 1 of 1

It is certified that error appears in the above-identified patent and that said Letters Patent is hereby corrected as shown below:

In the Claims

In Claim 17, Column 12, Line 14: "locatable a wellbore having a flow path comprising:" should read "locatable in a wellbore having a flow path comprising:"

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*